Dec. 2, 1930.  C. P. DUBBS  1,783,185
APPARATUS FOR PRODUCING LOWER BOILING POINT HYDROCARBONS
Original Filed Nov. 4, 1918   4 Sheets-Sheet 3
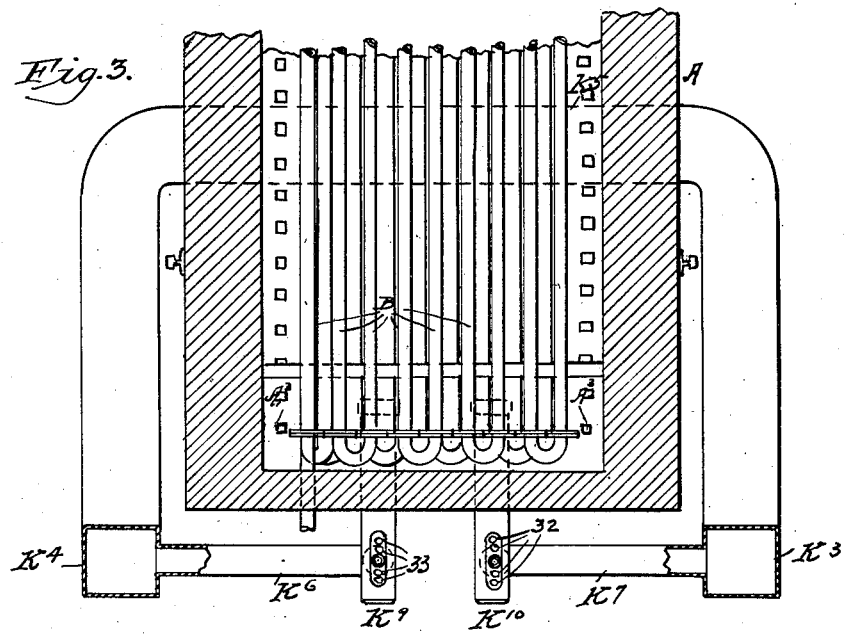
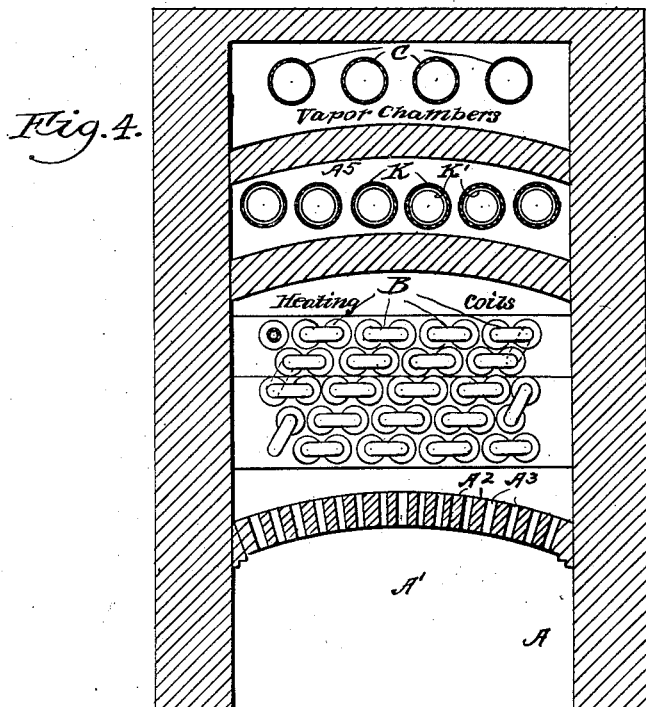

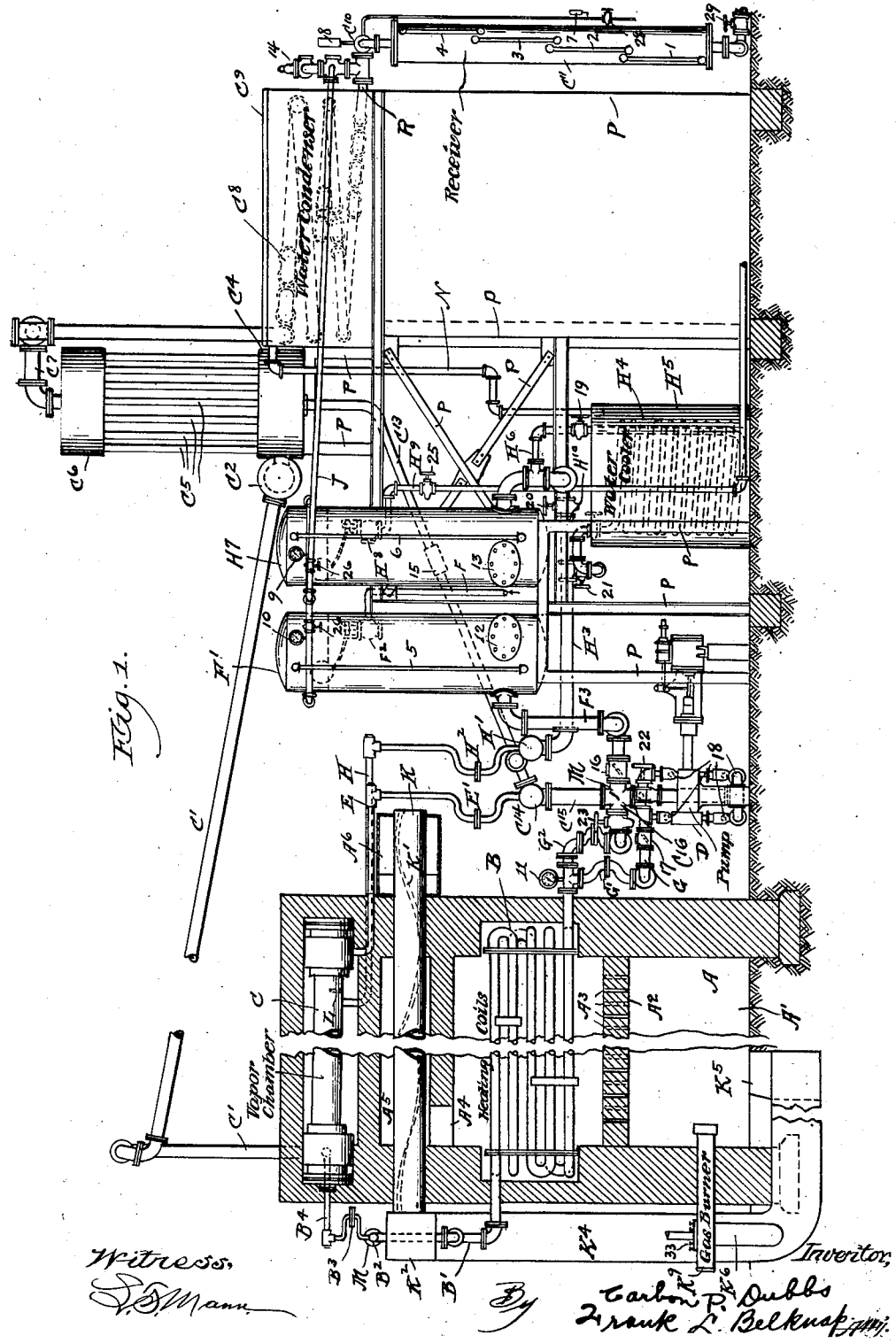

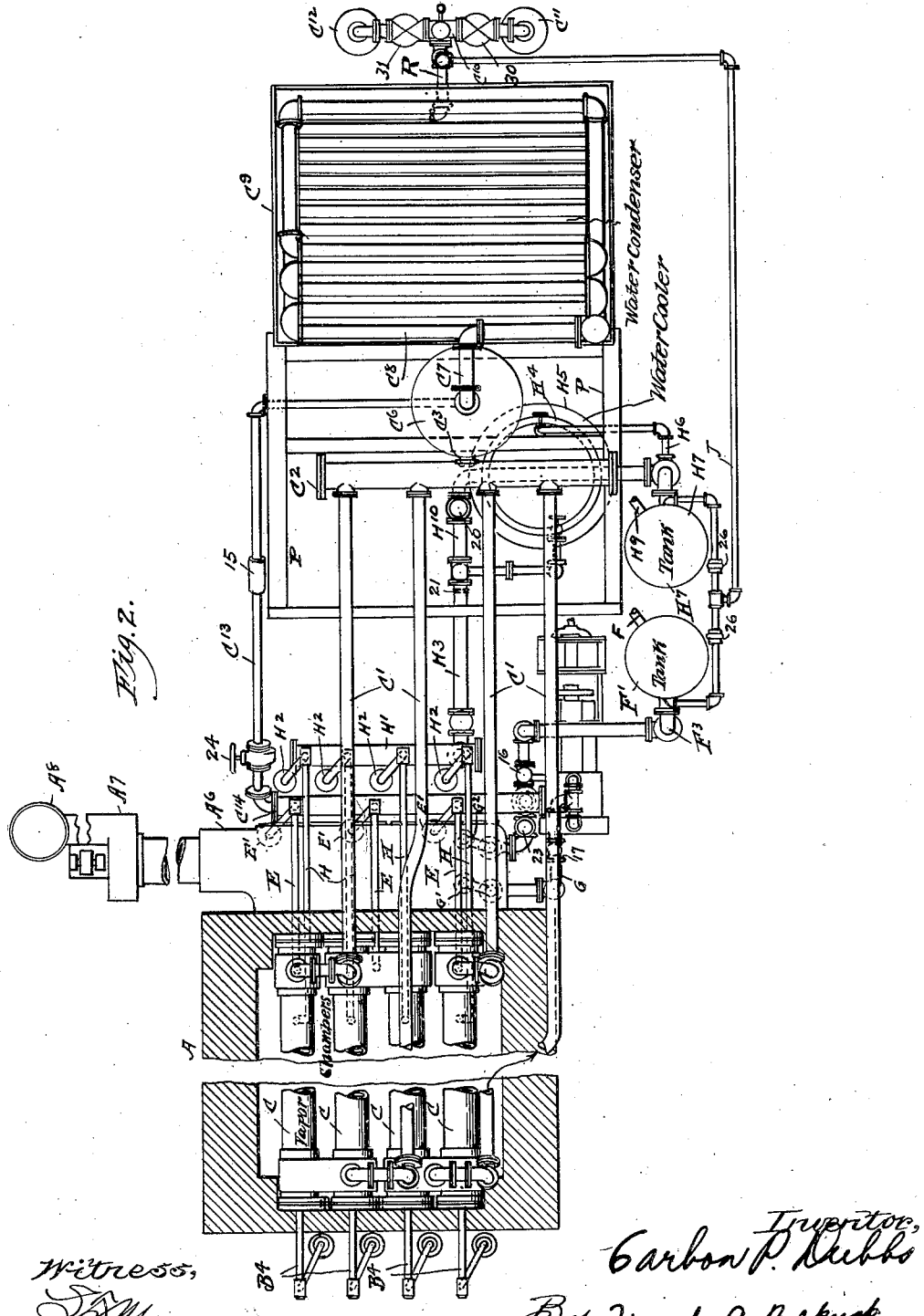

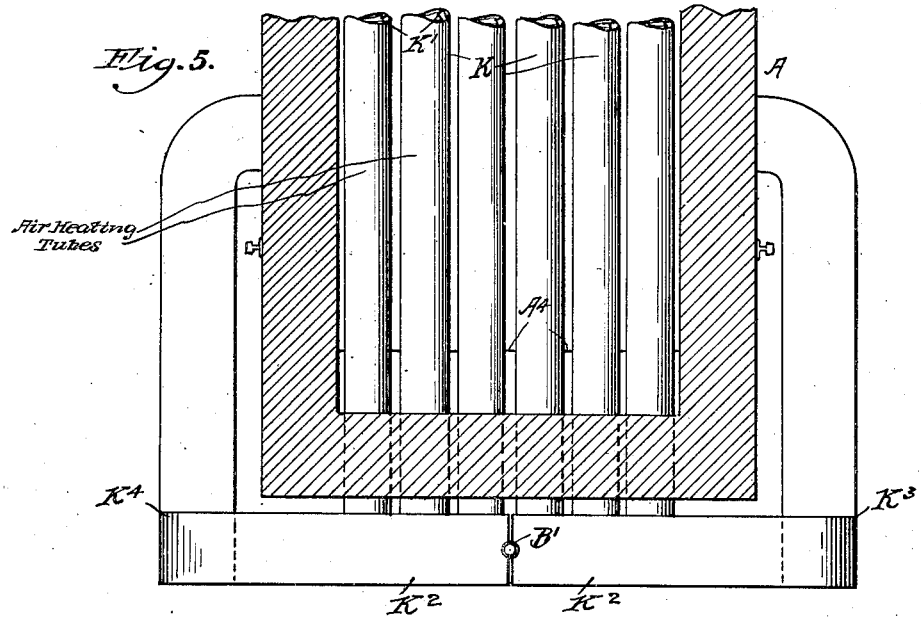
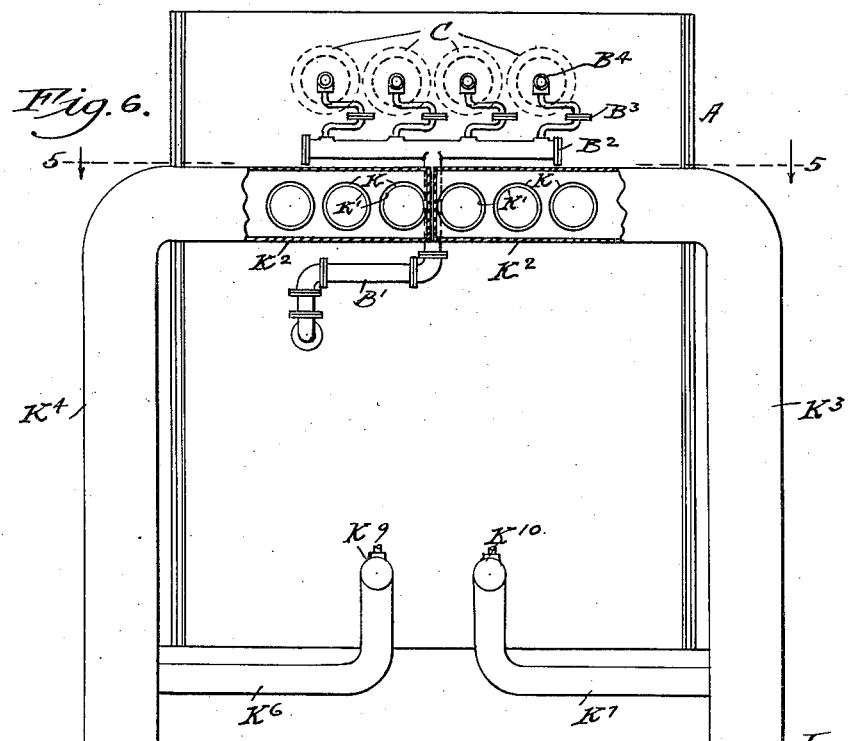

Patented Dec. 2, 1930

1,783,185

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR PRODUCING LOWER-BOILING-POINT HYDROCARBONS

Application filed November 4, 1918, Serial No. 260,957. Renewed June 9, 1926.

This invention relates to an apparatus for treating hydrocarbon oils to produce therefrom, products having lower boiling points.

The objects of the invention are, to provide an apparatus for separating oils of different boiling points; to provide an apparatus wherein the oil under treatment is circulated through a coil and then to and from a vapor chamber which latter chamber is only partly filled with the oil, the oil being heated as it passes through the former coil and as it passes through the latter chamber, the oil is relieved of more or less of its vapor content, which vapors pass to and through a condenser while more or less of an insoluble material, such as carbon formed in the oil, settles and is drawn off while the remaining unvaporized oil passes from the vapor chamber back to and through the heating tubes, the whole being maintained under pressure; to provide an apparatus in which the heating of the oil under treatment is accomplished in the heating coils and said oil maintained in rapid circulation in these coils and then discharged into one end of the vapor chamber, said chamber being only partially filled with the oil, and said oil withdrawn from said chamber at the other end and forced back through the heating coil, while more or less of the oil and carbon and other solids are drawn off as residuum, said vapor chamber being of such size in the cross section as to greatly reduce the speed of the flow of the oil from one end to the other and said chamber being of such dimensions as to permit more or less of the solid content of the oil to settle out and means being provided for the drawing off of more or less of the solids that are thus settled out of the oil along with part of the oil and means being provided for supplying fresh oil to the apparatus; to provide an apparatus for continuous operation; to provide an apparatus in which those products that are only partly reduced or converted to the desired low boiling point, are returned and further circulated through the heating tubes and the vapor chamber; to provide an apparatus in which, the vapors not having the desired low boiling points are condensed and automatically returned for further treatment; to provide a means whereby the free carbon produced can be settled out and removed without interrupting the operation of the still; to provide means whereby any settlement of carbon on the heating tubes will be indicated before the particular part of the apparatus where such carbon settled is injured; to provide a means of controlling the rate of flow of the oil through the heating tubes by means of pump or otherwise so as to more or less prevent the carbon and other solid matters from settling in such tubes; to provide a means of maintaining the oil in the heating tubes under sufficient flow as to maintain the small solid matters contained therein in suspension; to provide a means for automatically feeding the oil into the apparatus and removing the oil therefrom and automatically maintaining a predetermined level of oil in the vapor chamber; to provide a means for passing the distillates from the reflux condenser into the heating coils; to provide means for preheating the fresh air supplied to the furnace by utilizing the heat from the waste gases of said furnace; to provide in general an apparatus of the character referred to.

In the drawings:

Fig. 1 is a side elevation of the apparatus partly in section and partly broken away.

Fig. 2 is a plan view partly in section of the entire apparatus.

Fig. 3 is a sectional plan view of one end of the furnace showing the conduits for carrying the heated air to the gas burners and furnace proper and also showing the heating coils.

Fig. 4 is an end view in section of the furnace showing the heating coils with air conduits and the vapor chamber.

Fig. 5 is a plan view partly in section of one end of the furnace showing the air conduits connected with the conduit carrying the heated air to the furnace proper.

Fig. 6 is and end view of the furnace partly in section showing the air conduits and also the connection between the heating coils and the large coils.

Referring to the drawings, A—1 is the furnace proper. A—2 is an arch in the furnace having positioned in it, holes marked A—3 through which the heat and gases of combustion pass. A—4 is a flue opening into heat interchanging chamber A—5 which connects with flue breeching A—6, which connects with flue blower A—7 and with stack A—8. B are the heating coils which, by means of pipe B—1, manifold B—2, expansion joints B—3, and pipes B—4 connect with vapor chamber C and leading from this chamber are vapor lines C—1, connecting with manifold C—2 which connects, by means of pipe C—3 to header C—4 which header is connected by means of tubes C—5 to header C—6 and out of which header extends pipe C—7 which connects with coil C—8, positioned in the water tank C—9. Coil C—8 is connected by means of pipe R to manifold C—10 to receivers C—11 and C—12. Out of the bottom of header C—4 extends line C—13 and connects with manifold C—14 which connects by means of pipe C—15 to header C—16 and this header is connected with pump D. Extending from the vapor chamber are pipes E with expansion swings E—1 connecting to manifold C—14. F is the supply line to tank F—1 through float controlled valve F—2 and from this tank extends line F—3 to header C—16. G is the discharge from the pump D to the coils B, having on it expansion joint G—1. G—2 is a by-pass around the pump D. H are lines extending from the bottom of the vapor chamber to manifold H—1 and having expansion joints H—2. This manifold H—1 is connected by means of pipe H—3 to water cooled coil H—4 positioned in tank H—5, to line H—6 to tank H—7. Residuum is discharged from tank H—7 through float valve H—8 into discharge line H—9. From tanks F—1 and H—7 a gas line J, communicates with manifold C—10. K are the hot air conduits having baffle plates K—1 in them and connected with header K—2 having branches K—3 and K—4 extending down to the furnace through tunnel K—5 said branches K—3 and K—4 having branches K—6 and K—7 leading to gas burners K—9 and K—10. H—10 is a by-pass around the water cooling coil H—4. 1, 2, 3, 4, 5, 6 are liquid level gauges. 7, 8, 9, 10, and 11 are pressure gauges. 12 and 13 are manhole heads. 14 is a pressure relief valve. 15 is an expansion sleeve. 16 and 17 are check valves. 18 indicates the pump valves. 19, 20, 21, 22, 23, 24, 25, 26, 27, 28, 29, 30, 31, 32, and 33 are valves. L are baffle plates positioned in the vapor chamber between the draw-off line E and H to permit each draw-off to function without being substantially affected by the other. M are cable connections for pyrometers. N is a water overflow from tank C—9 into tank H—5. P are supports for the different parts of the apparatus.

Describing now the operation of the apparatus, the oil to be treated is forced by means of pump or other means not shown inward, through line F through float valve F—2 opening whenever liquid level falls into tank F—1 and flows from there through line F—3 continuously through check valve 16 into manifold C—16 into pump D constantly operating and is discharged through check valve 17 through line G into heating coils B and into line B—1 and the manifold B—2, through lines B—4 into vapor chamber C and the lighter unvaporized oil from there flows through line E through expansion joints E—1, into manifold C—14 and back into manifold C—16 and into the pump D and then back through the system as described. Fire is placed in the furnace A—1 and passes up through openings A—3 around the tubes B through flue A—4 through chamber A—5 and through breeching A—6. The air supply for the furnace is drawn from the atmosphere through tubes K and as it passes through chamber A—5 the heat from the waste furnace gases, passing through chamber A—5 preheats this air in the tubes K and the heated air passes through manifold K—2 into branches K—3, K—4 into the furnace through tunnel K—5 and to the gas burners K—9 and K—10 through branches K—6 and K—7.

The vapors liberated in the chamber C pass up through vapor lines C—1, into manifold C—2 into header C—4 thence through pipes C—5 into header C—6 through pipe C—7, through water cooled coil C—8 through manifold C—10 and from there go into receivers C—11 and C—12 and are drawn off through valve 29 to any suitable storage not shown, and the excess gas discharged through valve 28. The pressure in tanks F—1 and H—7 is maintained uniform by means of line J which permits the incondensible gases under pressure to flow into these tanks. The heavier unvaporized part of the oil in the chamber C is drawn off either continuously or intermittently through lines H, through expansion swings H—2, into manifold H—1, through line H—3 through valve 21 through water cooled coil H—4, through line H—6, into tank H—7. The oil can be discharged into tank H—7 through line H—3 without going through the water cooled coil H—4 by closing the valves 19 and 21 and opening valve 20, and passing the oil through by-pass line H—10 The level of the oil in the tank H—7 is controlled by float valve H—8 and the oil is discharged therefrom through line H—9, valve 25 to any desirable storage not shown.

It will be understood that the float valve F—2 is so arranged that it will open when the liquid level in the tank F—1 is lowered, while the float valve H—8 in the tank H—7 is so arranged that it will open when the liquid level in the tank H—7 is raised, these valves controlling the incoming raw oil and the discharged heavy residuum respectively.

It will readily be seen that this arrangement provides for a continuous operation, for the automatic maintenance of a definite level of liquid in the vapor chamber, the automatic utilization of the waste heat in the flue gases, the automatic control of the residuum withdrawn from the apparatus, means for circulation by convection without the use of the pump, the direct return of the reflux distillates to the heating zone and thus allow a uniform temperature to be maintained in the oil in the vapor chamber. It will be understood that the rate at which the oil will be circulated through the apparatus will be governed by the different factors such as the amount distilled off, the character of the oil being treated, etc., and the temperature used in the furnace, these factors having a bearing on the amount of solid material contained in the oil such as carbon, and the amount of agitation or velocity necessary to maintain same in suspension in the heating coils will vary. The entire system is subjected to a pressure either vapor or gas or otherwise created which pressure will range from 50 to 500 lbs. per square inch with pressure unit varying in accordance with conditions to be met. The temperature at which the oil is to be heated will vary approximately from 400° F., to 1200° F., although these limits are not absolute in either case. By this arrangement, a much hotter furnace temperature can be used in the furnace and a more economical fuel consumption obtained.

The following is an illustrative run on Mid-Continent gas oil. A gas oil of about 32 degrees Baumé gravity yielded from 30% to 50% light distillate when subjected to a temperature in the heating coils of from 400 to 1200 degrees F. and from 50 to 500 pounds pressure per square inch.

I claim as my invention:

1. In an apparatus for treating hydrocarbons, the combination with a heated coil mounted in a furnace, a vapor chamber for receiving the oil and vapors mounted above the said coil and communicating therewith, an air conduit interposed between the coil and the chamber and connected to the combustion chamber of the furnace, condensing and collecting means connected to the vapor chamber and means for maintaining a regulated pressure upon the system.

2. In an apparatus for treating hydrocarbons, the combination with a combustion chamber of a heating coil located therein, of a vapor chamber for receiving vapors from said coil, an air conduit introduced between the coil and the vapor chamber, and a chamber surrounding said air conduit adapted to receive heating gases from the combustion chamber.

3. An apparatus for treating hydrocarbons, comprising a furnace, a cracking coil therein, a vapor chamber receiving the products of conversion from said coil, a reflux condenser in communication with said vapor chamber through which vapors pass, means for withdrawing light residue from said vapor chamber, means for discharging reflux condensate from the condenser, and means for feeding raw oil to said cracking coil together with reflux condensate and said light residue, a residue tank, means for passing heavy residue from the vapor chamber to said tank, liquid level means within said tank operative to control the discharge of heavy residue therefrom, whereby the liquid level in said tank and vapor chamber is controlled, and means for maintaining a superatmospheric pressure on the oil undergoing distillation.

4. An apparatus for treating hydrocarbons, comprising a furnace, a cracking coil therein, a vapor chamber receiving products of conversion from said cracking coil, a reflux condenser in communication with said vapor chamber, a pair of tanks, means for admitting raw oil to one of the tanks through a valve actuated by the level of oil within said tank, means for discharging light residue from the vapor chamber, means for introducing to the cracking coil a hydrocarbon mixture consisting of oil from said raw oil tank, said light residue from the vapor chamber and reflux condensate from the reflux condenser, independent means for passing heavy residue from the vapor chamber to the other of said tanks, and liquid level means within said other tank operative to control the discharge of oil therefrom.

5. In an apparatus for treating hydrocarbons, the combination with a heating coil, of a furnace through which said coil passes, a vapor chamber in communication with the coil, a reflux condenser and a communication between said reflux condenser and said vapor chamber, means for discharging reflux condensate from said reflux condenser, means for continuously introducing raw oil and reflux condensate to said heating coil, a residuum tank, an open communication between said vapor chamber and said residuum tank, a liquid level control valve in said tank for discharging residuum therefrom whereby the liquid level in said vapor chamber and residuum tank is controlled.

6. In an apparatus for treating hydrocarbon oil, the combination with a heating coil, of a furnace, within which said coil is positioned, a vapor chamber in communication with the coil, means for returning light unvaporized oil from said vapor chamber to said coil and means for withdrawing heavy unvaporized oil from said chamber without being again admitted to said coil and means associated with said last mentioned means for maintaining a predetermined liquid level in said vapor chamber, and means for maintaining a superatmospheric pressure on the oil undergoing treatment in the apparatus.

7. In an apparatus for treating hydrocarbon oil, the combination with a heating coil, of a furnace, within which said coil is positioned, a vapor chamber in communication with the coil, means for returning light unvaporized oil from said vapor chamber to said coil, means for maintaining a superatmospheric pressure on the oil undergoing treatment in said coil and chamber, draw-off means for withdrawing heavy unvaporized oil from said chamber without again admitting the same to said coil, additional means associated with said draw-off means for maintaining a predetermined liquid level in said vapor chamber, said additional means comprising a tank in which a body of the unvaporized oil collects, and means for maintaining the same pressure on the oil collecting in said tank as is maintained on the oil in said coil and chamber.

8. In an apparatus for treating hydrocarbon oil, the combination with a heating coil, of a furnace, within which said coil is positioned, a vapor chamber in communication with the coil, means for returning light unvaporized oil from said vapor chamber to said coil, means for withdrawing heavy unvaporized oil from said chamber without again being admitted to said coil and means associated with said last mentioned means for maintaining a predetermined liquid level in said vapor chamber, means for maintaining a superatmospheric pressure on the oil undergoing treatment in the apparatus, additional means for introducing incoming charging oil to said coil, said additional means including a tank containing a body of oil maintained under the same pressure as the oil undergoing treatment in the remaining portions of the apparatus.

CARBON P. DUBBS.